(12) United States Patent
Rinneberg (10) Patent No.: US 9,058,345 B2
(45) Date of Patent: Jun. 16, 2015

(54) SYSTEM AND METHOD OF GENERATING REUSABLE DISTANCE MEASURES FOR DATA PROCESSING

(75) Inventor: Thomas Rinneberg, Schriesheim (DE)

(73) Assignee: SAP SE, Walldorf (DE)

( * ) Notice: Subject to any disclaimer, the term of this patent is extended or adjusted under 35 U.S.C. 154(b) by 732 days.

(21) Appl. No.: 12/640,958

(22) Filed: Dec. 17, 2009

(65) Prior Publication Data

US 2011/0153627 A1 Jun. 23, 2011

(51) Int. Cl.
*G06F 17/30* (2006.01)
(52) U.S. Cl.
CPC .... *G06F 17/30306* (2013.01); *G06F 17/30569* (2013.01); *G06F 17/30539* (2013.01)
(58) Field of Classification Search
CPC ............... G06F 17/30306; G06F 17/30539; G06F 17/30569
USPC ....................................................... 707/758
See application file for complete search history.

(56) References Cited

U.S. PATENT DOCUMENTS

| 6,360,227 | B1 * | 3/2002 | Aggarwal et al. ............... 1/1 |
| 6,389,414 | B1 * | 5/2002 | Delo et al. ...................... 1/1 |
| 2007/0086621 | A1 * | 4/2007 | Aggarwal et al. ........... 382/103 |
| 2008/0010312 | A1 * | 1/2008 | Gupta ......................... 707/102 |
| 2008/0208855 | A1 * | 8/2008 | Lingenfelder et al. ........... 707/6 |
| 2010/0174678 | A1 * | 7/2010 | Massand ..................... 707/610 |

* cited by examiner

*Primary Examiner* — Shew-Fen Lin
(74) *Attorney, Agent, or Firm* — Fountainhead Law Group PC (57) ABSTRACT

In one embodiment the present invention includes a computer-implemented method of analyzing data. The method includes storing, by a computer system, a column definition that includes metadata that defines a column. The method further includes generating, by the computer system, a distance measure for the column. The method further includes storing, by the computer system, the distance measure for the column as part of the metadata for the column in the column definition. In this manner, improvements may result in the areas of reuse, delegation, usability, and precalculation.

20 Claims, 5 Drawing Sheets

SYSTEM AND METHOD OF GENERATING REUSABLE DISTANCE MEASURES FOR DATA PROCESSING

CROSS REFERENCE TO RELATED APPLICATIONS

Not applicable.

BACKGROUND

The present invention relates to data analysis, and in particular, to improving the efficiency of data analysis with reusable distance measures.

Unless otherwise indicated herein, the approaches described in this section are not prior art to the claims in this application and are not admitted to be prior art by inclusion in this section.

For data analyzing applications such as data mining, graphical display or data matching, different data values of the same column of a data table must be compared to calculate a similarity or distance of two rows of the table. However used as-is, values of most columns cannot be compared, since the values cannot be ordered meaningfully (e.g. customer number, ISBN number [International Standard Book Number], etc.) (so called "unordered columns"). Instead, these columns must be replaced by ordered columns which might come from different data sources (customer number might be replaced by income, region and age; ISBN number might be replaced by pages of the book; etc.), so data preparation and selection is complex.

However even replaced columns might not be arithmetically comparable (e.g. region), even though comparison rules can be created in principle.

Also ordered columns need some data preparation, e.g. scale norming, so that the data analysis and display algorithms work properly. These data preparation tasks usually need to be done each time a data table shall be used for an analysis, even though some of the columns might have been analyzed in other analysis projects with other data tables before.

SUMMARY

Embodiments of the present invention improve the efficiency of data analysis with reusable distance measures. In one embodiment the present invention includes a computer-implemented method of analyzing data. The method includes storing, by a computer system, a column definition that includes metadata that defines a column. The method further includes generating, by the computer system, a distance measure for the column. The method further includes storing, by the computer system, the distance measure for the column as part of the metadata for the column in the column definition.

The following detailed description and accompanying drawings provide a better understanding of the nature and advantages of the present invention.

DETAILED DESCRIPTION

Described herein are techniques for improving the efficiency of data analysis with reusable distance measures. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In general, an embodiment of the present invention stores distance measures (e.g., the rules for how two columns are to be compared) as metadata of the column definitions. Such a technique is useful when the data to be analyzed is stored in a column definition where the columns are named columns with their own metadata that can be used in different data tables. This is the case in many data warehousing systems, such as the SAP Business Information Warehouse (BW) from SAP AG, Walldorf, Germany. (In the SAP BW, the data columns may be referred to as InfoObjects.)

Storing distance measures as metadata of the column definitions may realize one or more of the following advantages: reuse, delegation, usability, distance measures, business content, and precalculation. Regarding reuse, once a distance measure is defined, it can be used in any analysis. In a specific analysis task, the user only needs to choose which distance measure per column shall be used. Regarding delegation, the distance measure can use components and other metadata (e.g. external hierarchies) of the column, thus recursively making use of other data without need to explicitly model data access. Regarding usability, the distance measure definition can be supported by specific user interfaces to guide the user. Specific options and distance measure types can be offered, which make use of the metadata of the column, for which the distance measure shall be defined. Regarding distance measures, there are two types of distance measures: norms and metrics; the prior being usable for data display and data comparison (since they define the distance of the value from a common origin), the latter only for data comparison (since they define the distance between two values without existence of a common origin). Regarding business content, distance measures can be predefined and delivered by the software vendor for different columns, so customers have less work with data preparation. Regarding precalculation, distance measures may be precalculated, so calculation of the actual analysis is faster (the data set needs to be calculated only once before the actual comparison algorithm and does not need to be re-calculated with any new analysis).

According to an embodiment, for a particular column definition, a set of distance measures are attached. (The term "column definition" may be used to describe InfoObjects in a particular BW implementation; the term "data model" may be used generally to describe all BW objects, including InfoObjects, InfoProviders [where the information is stored], and the relationships between them.) The user is required to define distance measures for a particular column definition only once. Access is then unique for any functions that are needed to compare data records. If several column definitions come together in a data structure, the functions may derive distance measures from the chosen distance measures for the single column definition. If all distance measures are norms, even pre-processing (e.g., mapping the data space onto the unit cube) can be done outside the mining engine (e.g. with standard loading transformations) or at least before saving the training set. The distance measures may be deliverable with business content.

According to an embodiment, for an unordered column (like material number), three methods may be used to define a distance measure: by selecting an external hierarchy on the column definition; by deriving a distance measure from the distance measures of the components and texts of the column definition; or by a customer-coded routine. (An ordered column is a column where the natural order [given by its data type] of the column is meaningful for the analysis to be undertaken. An unordered column is a column where this condition does not hold true. According to an embodiment using BW, an ordered column may be referred to as a "key figure" and an unordered column may be referred to as "characteristics".)

According to an embodiment, for ordered column definitions the axis may be stretched such that the histogram on the new axis is evenly distributed. This means the axis is mapped bijective nonlinearly to another axis, where the histogram is a horizontal line. This is like a magnifier on areas of high frequency of the dimension.

Figure 1:
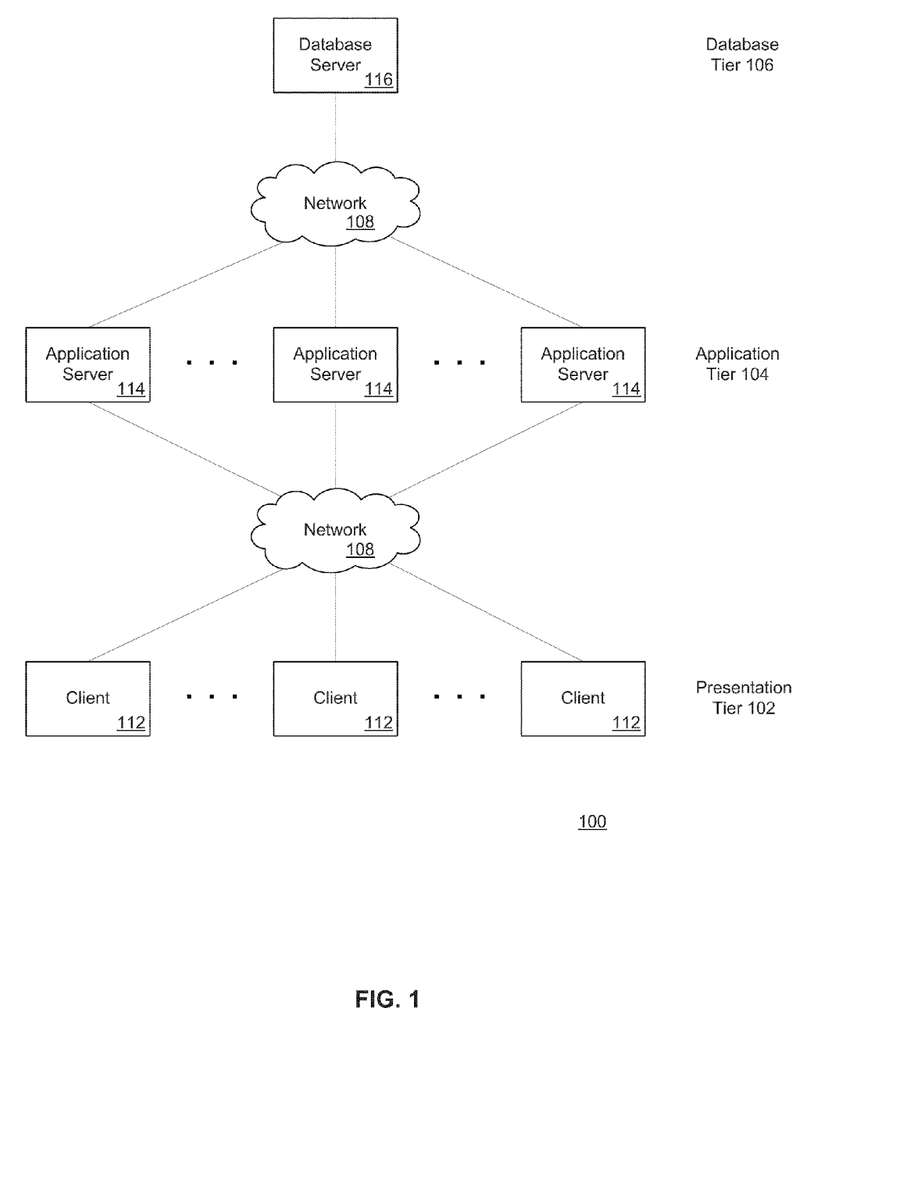
FIG. 1 is a block diagram of a three tier network system 100 according to an embodiment of the present invention.

FIG. 1 is a block diagram of a three tier network system 100 according to an embodiment of the present invention. The system 100 includes a presentation tier 102, an application tier 104, and a database tier 106. A network 108 connects the devices within and between the tiers. (Although two network labels 108 are shown, it is to be understood that the network 108 may be implemented as two or more networks, or as a single network such as the internet; the network 108 may connect to other networks (not shown).)

The presentation tier 102 generally includes one or more client computers 112. The client computers 112 generally provide a graphical user interface for users to interact with the other parts of the system 100.

The application tier 104 generally includes one or more application servers 114. The application servers 114 generally implement the business logic for processing interactions between the users and the underlying data. Various of the application servers 114 may perform different functions. For example, two application servers 114 may be used for load balancing, load distribution or scaling purposes.

The database tier 106 generally includes a database server 116 and one or more storage devices (e.g., disk drives) (not shown). The database server 116 generally implements a database management system that stores and manipulates the underlying data and related metadata using the storage devices.

Although many separate devices are described in each tier, such is mainly for illustration purposes to show scalability. For example, a single disk drive may be used in the basic configuration, but as the amount of data in the databases increases, the number of disk drives may be increased. As another example, a single application server may be used in the basic configuration, but as the amount of business logic processes increases, the number of application servers 114 may be increased.

The system 100 may be implemented in a variety of operating systems, for example, UNIX (AIX, HP-UX, Solaris, Linux), Microsoft Windows, IBM Series i (former iSeries, AS/400) and IBM zSeries (former S/390). Various types of database systems may be used, including DB2, Informix, MaxDB, Oracle and Microsoft SQL Server. The SAP Web Application Server is a specific example of an implementation of the system 100.

The system 100 may be used to implement one or more of the features of the present invention (as described in more detail in subsequent paragraphs). According to an embodiment, the metadata definition takes place on one of the clients 112, which communicates with one of the application servers 114; the result of the configuration will then be stored in the database by the database server 116. At runtime, one of the application servers 114 reads the definition from the database and executes the calculations described by the metadata.

Figure 2:
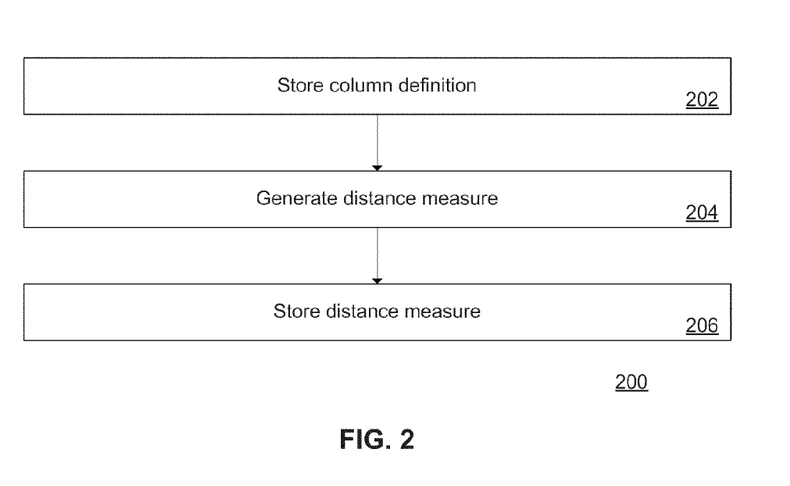
FIG. 2 is a flowchart of a process 200 to generate reusable distance measures according to an embodiment of the present invention.

FIG. 2 is a flowchart of a process 200 to generate reusable distance measures according to an embodiment of the present invention. The process 200 may be performed by the system 100 (see FIG. 1). The process 200 may be implemented as one or more computer programs that are stored by and executed on one or more computer systems (e.g., the system 100). For example, the process 200 may be performed by a database management program executed by a database server 116 and by a distance measurement generator program executed by an application server 114.

At 202, a column definition is stored. The column definition includes metadata that defines a column. For example, a database server in the database tier 106 (see FIG. 1) may store the column definition in a database. A database management program may control the operation of the database server to perform the acts described at 202.

At 204, a distance measure is generated for the column. (A number of processes to generate a distance measure are described in subsequent paragraphs.) For example, an application server in the application tier 104 (see FIG. 1) may generate the distance measure. Furthermore, the application server may interact with the presentation tier 102 so that a user may select the column for which the distance measure is to be generated, as well as to select the various types of distance measures to be used and their parameters (as more fully described in subsequent sections). A distance measurement generator program may control the operation of the application server to perform the acts described at 204.

At 206, the distance measure for the column is stored as part of the metadata for the column in the column definition. For example, a database server in the database tier 106 (see FIG. 1) may store the distance measure as part of the metadata for a column in the database. Furthermore, the application server may instruct the database server to perform 206 after the application server has generated the distance measure (see 204). The distance measurement generator program may control the application server to perform the acts described at 206.

Once the distance measures have been stored as metadata in the column definition, the usability of functions that compare values of a column increases. A short summary of a use case involving the distance measures stored as metadata is as follows. First, the user requests a comparison between two (or more) values of a column. Second, the application server accesses the definition of the column via the database server. The column definition includes the distance measures stored as metadata of the column definition. Third, the application server accesses the distance measure metadata in the column definition. Fourth, the application server performs the comparison according to the distance measure metadata. Fifth, the client computer displays the results comparison. The comparison may be performed by one of the application servers 114 (see FIG. 1). A comparison program may control the operation of the application server to perform the comparison. Often, the comparison is embedded in another activity, such as data mining, data visualization, or matching. These other activities may themselves define how the comparison is to be performed. For example, for data mining, a data mining algorithm may define by its structure how the data is accessed, whether all the data must be read from the database prior to the comparison, whether the comparisons might be parallelized, etc.

The column definition in general may be created first (e.g., in main memory), then particular distance measures can be added, and then the resulting column definition and metadata is stored to the database (separately or together) in the end. A given distance measure may make use of the other information stored as column definition, for example the external hierarchies attached (if any) or the columns it is aggregated of (if any). A customer routine, for instance, would in general not make much use of the other information of the column, but this is up to the customer who creates the routine.

Figure 3:
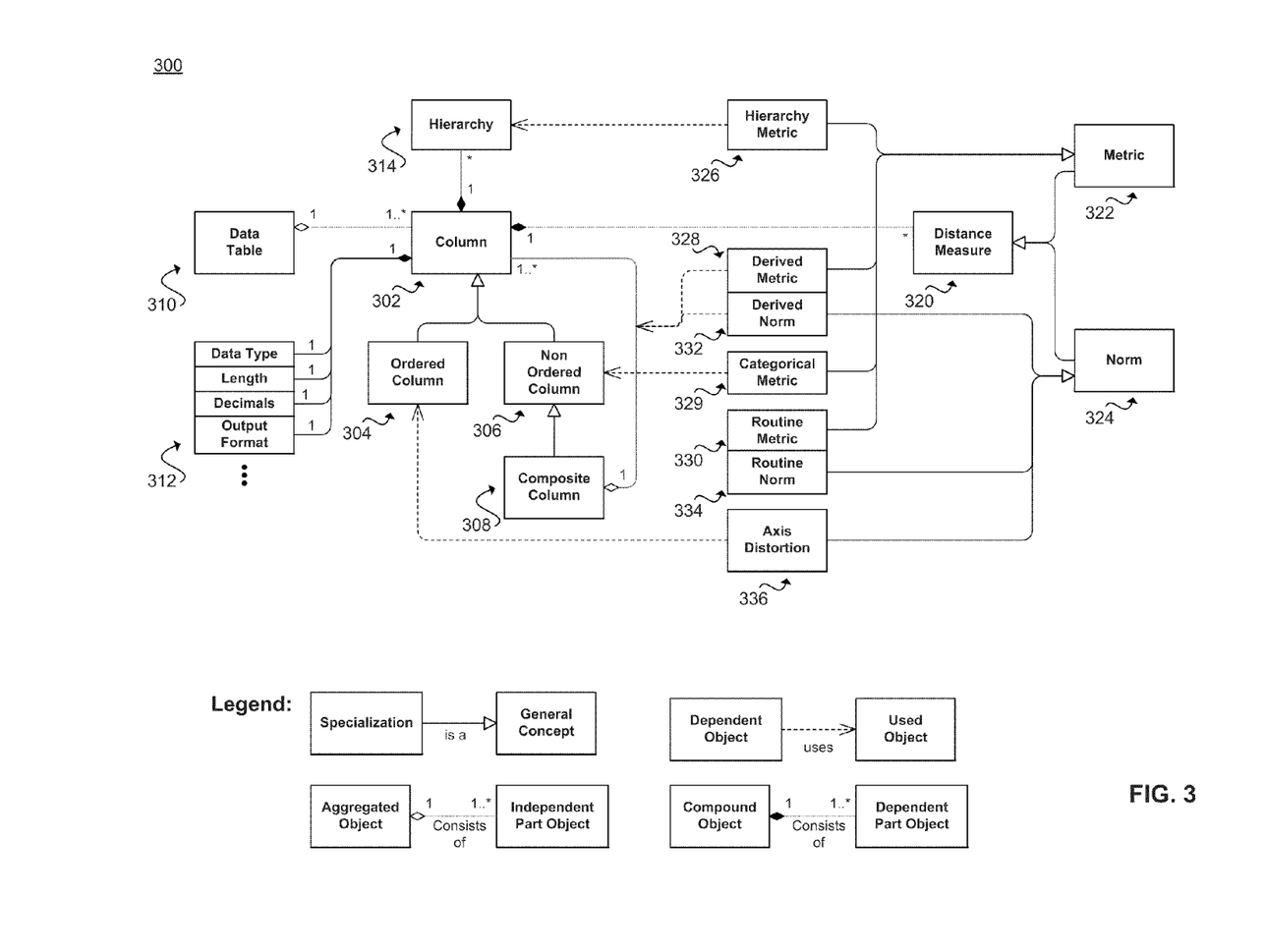
FIG. 3 is an entity relationship diagram 300 that shows the relationships between entities associated with an embodiment of the present invention.

FIG. 3 is an entity relationship diagram 300 that shows the relationships between entities associated with an embodiment of the present invention. A data table (e.g., an InfoProvider) is an aggregation (in the universal markup language sense of the word) of column definitions (e.g., InfoObjects). This means the user may model the column definitions independent from their usage in data tables. On the other hand, also a column definition may be (but not necessarily is—different from a data table) an aggregation of other columns, recursively. The terms "column" and "column definition" may be used interchangeably, as long as the distinction is kept in mind: The column definition is the definition of the column. In UML terminology, the column is the object, and its descriptions and relationships (i.e., the metadata) is the column definition. The entity relationship diagram 300 shows that the column 302 may be an ordered column 304 or an unordered column 306. The unordered column 306 may be a composite column 308 (i.e., it is referring to some other columns 302). A data table 310 consists of one or more columns 302. The column 302 is a compound object that consists of various dependent part objects 312 such as data type information, length information, decimals information, output format information, etc. The column 302 may have some (dependent) external hierarchies 314, by which the values of the column can be ordered hierarchically.

The distance measure 320 may be a metric 322 or a norm 324. The metric 322 may be a hierarchy metric 326, a derived metric 328, a categorical metric 329, or a routine metric 330. The norm 324 may be a derived norm 332, a routine norm 334, or an axis distortion norm 336. (These entities are described in more detail below.) The derived metric 328 and the derived norm 332 use the relationship between the column 302 and the composite column 308 to define and calculate a distance measure, which delegates the distance calculation to the component columns 302 of the composite column 308. (The details are explained below.) The hierarchy metric 326 uses one of the hierarchies 314 to define and calculate a metric, which uses the hierarchical ordering of the values of column 302. (The details of this are explained below.) The categorical metric 329 creates a probability vector for the allowed values of the column. (The details are explained below.) The axis distortion norm 336 performs a mapping of the value space of the ordered column 304 onto the unit interval [0, 1]. (The details of this are explained below.)

A number of types of distance measures may be implemented according to various embodiments of the present invention. These distance measures include deriving distances from components, distance along a hierarchy, axis distortion or automatic binning, categorical metrics, and measurement-specific adoption rules.

Deriving Distances from Components

For a composite column (e.g., a customer number has the components gender, age, name, address, . . . ), a norm or metric can be created by delegating the calculation to the components. ("Components" may also be referred to as "component columns" with respect to the composite column.) This calculation may be performed as follows: Let d be a data value of the composite column and $a_1, a_2, \ldots$ the values of the corresponding components. Then $|d|=w_1|a_1|+w_2|a_2|+\ldots$ is the norm of d. The figures $w_i$ are appropriately chosen scalar weights. If for any chosen $a_i$ no norm is defined, then $w_i=0$, the component cannot be taken into consideration.

If for any $a_i$ no norm, but a metric is defined, a metric instead of a norm can be derived for d as follows: Let d, d' be two data values of the compound characteristic to be compared, and $a_1, a_2, \ldots$ resp. $a'_1, a'_2, \ldots$ the corresponding values of the components. Then $(d,d') = w_i(a_i, a') + w_2(a_2, a'_2) + \ldots$ is the distance between d and d'.

If a metric is derived for a special purpose, e.g. to predict a target field, then the weights should express the importance of the fields upon the target field. A natural measure for this is the correlation between the field and the target field since the absolute value of the correlation is perfectly between 0 and 1. The correlation can be calculated automatically.

Often it is very useful to also consider not only the components, but also the descriptions of a column definition for a distance measure. Examples are the customer number, where similar names of different customer numbers may indicate that it is indeed the same customer.

Various different metrics may be used to compare text fields as desired in various embodiments. Exemplary metrics include editing distance, typewriter distance and phonetic distance. The editing distance (which may also be referred to as the Levenshtein distance) is defined as the minimal number of operations (such as insert, delete and replace) to transfer one text sample into another. The typewriter distance defines the distance between two not coinciding letters as equal to the distance on a keyboard between the letters. (This catches typing errors.) The phonetic distance is language dependent, and not only letters but also letter combinations are compared by their sound. For example, the "soundex" measure may be used to compute the phonetic distance between English phrases, and the "Cologne phonetics" measure may be used for German.

Distance Along a Hierarchy

Many non-ordered columns like e.g. the customer number or the material number have been ordered highly sophisticated by external hierarchies (e.g. the region might be ordered in a hierarchy like e.g. world>continent>country>state>region). For different purposes, different hierarchies exist. If the column carries an external hierarchy, it is straightforward to compare two values from their distance in this hierarchy.

To do this, the hierarchy may be mapped to the unit circle, regardless the depth of the hierarchy (otherwise the distance could be unforeseeable big, but no distance between two values shall ever exceed 1, since it must be comparable to distances of other columns in order to make it usable for derived metrics). This may be done as follows: The root of the hierarchy is mapped against the origin of the circle. The distance between the origin and nodes on the first level equals ¼. The distance between nodes on the first level and the second level of the hierarchy equals ⅛. Between the second and third level it equals ​1⁄16, and so forth. Thus the distance between the root and the lowest level of any hierarchy (i.e. the sum of the distances between the different levels) never exceeds ½, because of the following series:

$$\sum_{i=1}^{\infty} \frac{1}{2^{i+1}} \to \frac{1}{2}$$

Moreover, this can handle unbalanced hierarchies easily, because deeper levels are less important.

Now, the distance between two nodes in the hierarchy is the sum of the distances along the shortest path between the nodes along the hierarchy. The distance between two arbitrary nodes in the hierarchy thus never exceeds 1 (as the maximum path is from the deepest level up to the root and back to the deepest level of another branch, which is in the limit ½+½).

This distance measure is no norm, because there is no origin (the root node is not part of each shortest path between any two nodes).

Axis Distortion or Automatic Binning

Ordered columns sometimes suffer from highly non-linear histograms. The differences in the occurrence frequency cause instabilities in cluster algorithms, which then tend to cluster in the region of the highest occurrence of sample points and no representative will go to the other parts of the value space (if not the cluster algorithm is very good to cope with such behavior). To overcome this, manual binning is often used as data preparation step, e.g. the values are divided into bins or categories, such that approximately the same number of values fall into each category. The following distance measure will distort the value axis automatically, such that the histogram is evenly distributed.

Figure 4:
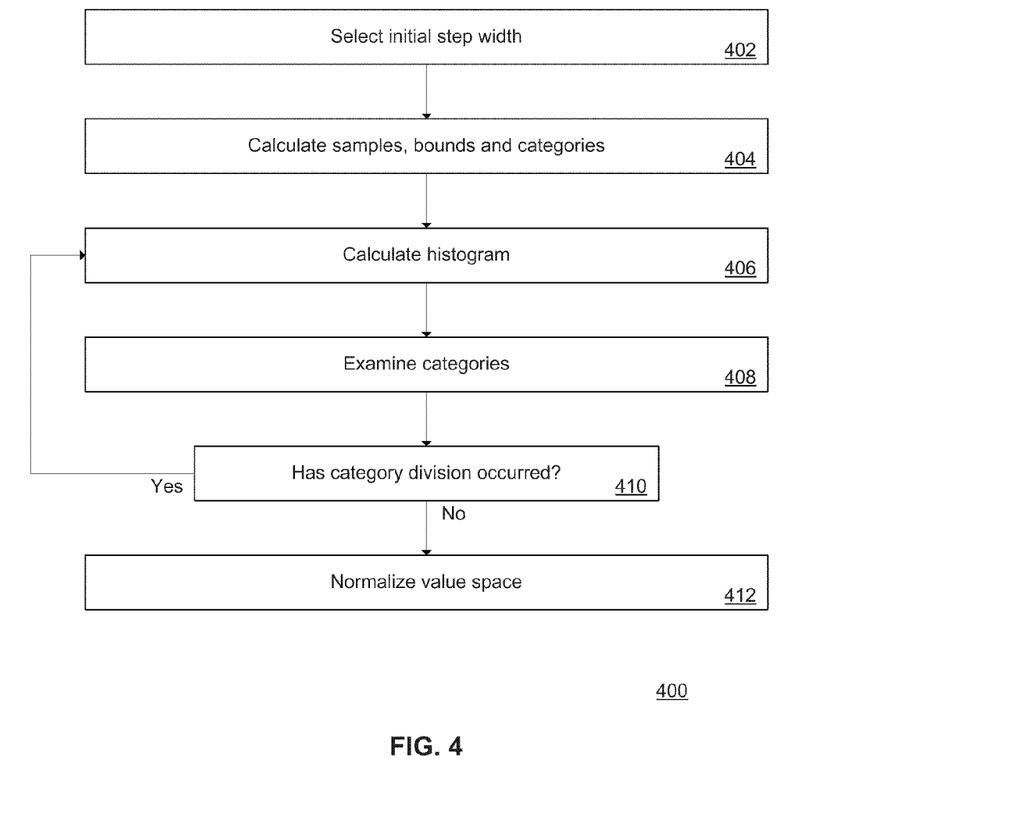
FIG. 4 is a flowchart of a method 400 of generating an evenly distributed histogram, according to an embodiment of the present invention.

FIG. 4 is a flowchart of a method 400 of generating an evenly distributed histogram, according to an embodiment of the present invention. The method 400 implements the axis distortion and automatic binning discussed above. The method 400 may be performed by a computer system (e.g., the application server 114). A computer program may control the operation of the application server 114 to perform the method 400.

At 402, the user selects the initial step width of the histogram, e.g. equal one unit of measure of the column.

At 404, the computer system calculates the number n of samples in the data, the lower and upper bound of the data (rounded to the initial category step width), and the number of categories c. Then the mean number m of samples per category is calculated as n/c.

At 406, the histogram is calculated, i.e for each category i the number $s_i$ of points within the category is counted.

At 408, one category after the other is examined. This examination may be performed via a process described in pseudocode in TABLE 1 as follows.

TABLE 1

Initialize $s_{old}$ = 0.
Loop at categories i.
    $s_{old} = s_{old} + s_i$
    If $s_{old}$ > m, then
        Divide the category into p new categories of equal size,
        where p = round ($s_{old}$ / m).
        Clear $s_{old}$.
    Else.
        Merge this category with next one, thus:
        Keep the lower bound of the category and also keep $s_{old}$.
    Endif.
Endloop.

At 410, if there had been a category division taken place, e.g. for any category $s_{old}$ > m, repeat 406 and 408 with the new (merged and split) categories.

At 412, the final intervals are mapped against [0,1] to normalize the value space: Upper bound of category i is mapped against i/c, lower bound of category i is mapped against (i−1)/c.

Using the two-point-form of the linear equation, this gives a piecewise linear (thus bijective) function, which can be used to map the value space against [0,1].

Distance Measure Creation Examples

Described below are five examples (E1-E5) of creating a distance measure using an embodiment of the present invention. The examples are discussed as sequences of numbered steps.

Example E1

(1) The modeler (user) enters the list of distance measures for the column definition; this may be via a maintenance screen displayed by the client computer. (2) The modeler selects "create" to define a new distance measure. (3) The client computer displays a distance measure definition screen. (4) The modeler enters a description for the new distance measure. (5) The modeler selects "categorical" for the type of the distance measure. The application server generates the distance measure. (6) The modeler presses "save". The application server instructs the database server to save the distance measure.

Example E2

Steps 1-4 are the same as for Example E1. (5) The modeler selects "ordered" for the type of the distance measure and activates the "distortion of axis" function. (6) The client computer displays the distortion definition screen. (7) The modeler defines the sample size and precision (initial step width) to create the histogram and starts the calculation (eventually plans a batch job) of the histogram and the distortion result. The application server generates the distance measure. (8) The modeler looks at the histogram and the new axis with the evenly distributed histogram and decides if the new axis or the original axis shall be used for the distance measure. (9) The modeler leaves the distortion definition screen and saves his settings in the distance measure definition screen. The application server instructs the database server to save the distance measure.

Example E3

Steps 1-4 are the same as for Example E1. (5) The modeler selects "sorted" for the type of the distance measure and activates the "hierarchy" function. (6) The client computer displays a list of hierarchies for the column definition. (7) The modeler selects a hierarchy. The application server generates the distance measure. (8) The modeler leaves the selection screen and saves his settings in the distance measure definition screen. The application server instructs the database server to save the distance measure.

Example E4

Steps 1-4 are the same as for Example E1. (5) The modeler selects "derived" for the type of the distance measure and activates the "components" function. (6) The client computer displays a list of components for the column definition, together with a field to enter the weight of each component. (7) The modeler selects the relevant columns, selects the distance measure for each relevant column (only columns having norms or metrics are selectable), and enters the weights or presses "calculate weights". The application server generates the distance measure. (8) The modeler leaves the selection screen and saves his settings in the distance measure definition screen. The application server instructs the database server to save the distance measure.

Example E5

Steps 1-4 are the same as for Example E1. (5) The modeler selects "coded" for the type of the distance measure and activates the "routine" function. (6) The client computer displays a routine editor. (7) The modeler enters his code. The application server generates the distance measure. (8) The modeler leaves the selection screen and saves his settings in the distance measure definition screen. The application server instructs the database server to save the distance measure.

Categorical Metrics

Categorical metrics include the categorical distance. To determine the categorical distance, the value space is extended by additional columns, one for each possible value of the categorical column, where each of the additional columns may have any value between "true" or "false". For example, the column "color" with possible values {red, green, blue} is replaced by three columns "red", "green" and "blue" which each may have values [1, 0] for "probability of truth". This then allows data mining training rules to define values along a probability vector. For example, the training rules may define "a little red" and "very much blue", e.g. (red|green|blue)=(0.2|0.0|0.9).

Measurement-Specific Adoption Rules

If an algorithm (e.g. a data mining algorithm) incorporates an adoption rule, it creates new data values (in data mining: The representatives), which are similar but not equal to given values of a particular column. In general, adoption rules work such that the given value shall be changed to be x percent more similar to another presented value. If x=100%, this means the new value shall become equal to the presented value; if x=0%, this means the old value shall not be changed. If x=50%, the new value shall be in the middle between the old value and the presented value.

Consider for instance the categorical metrics described before, where a data value which is equally similar to both the data values "green" and "blue" would be expressed in the probability vector (green|blue) as (0.5|0.5). This representation however is no longer a valid value of the original domain, where only either "green" or "blue" are allowed values, i.e. only (1|0) or (0|1). So the new similar value cannot be stored in the original data format without losing information.

To address this issue in an embodiment of the present invention, the distance measure object offers a data storage (e.g., in main memory) of data values in a representation that is suitable for calculation of the distance during (at least) the lifetime of the algorithm. According to an embodiment, this may be implemented by transforming each value of a column into the new value space, and performing the comparison in the new value space. In summary, an embodiment of the present invention stores representations of the data values of the column, where the representations are suited for data value comparison.

Figure 5:
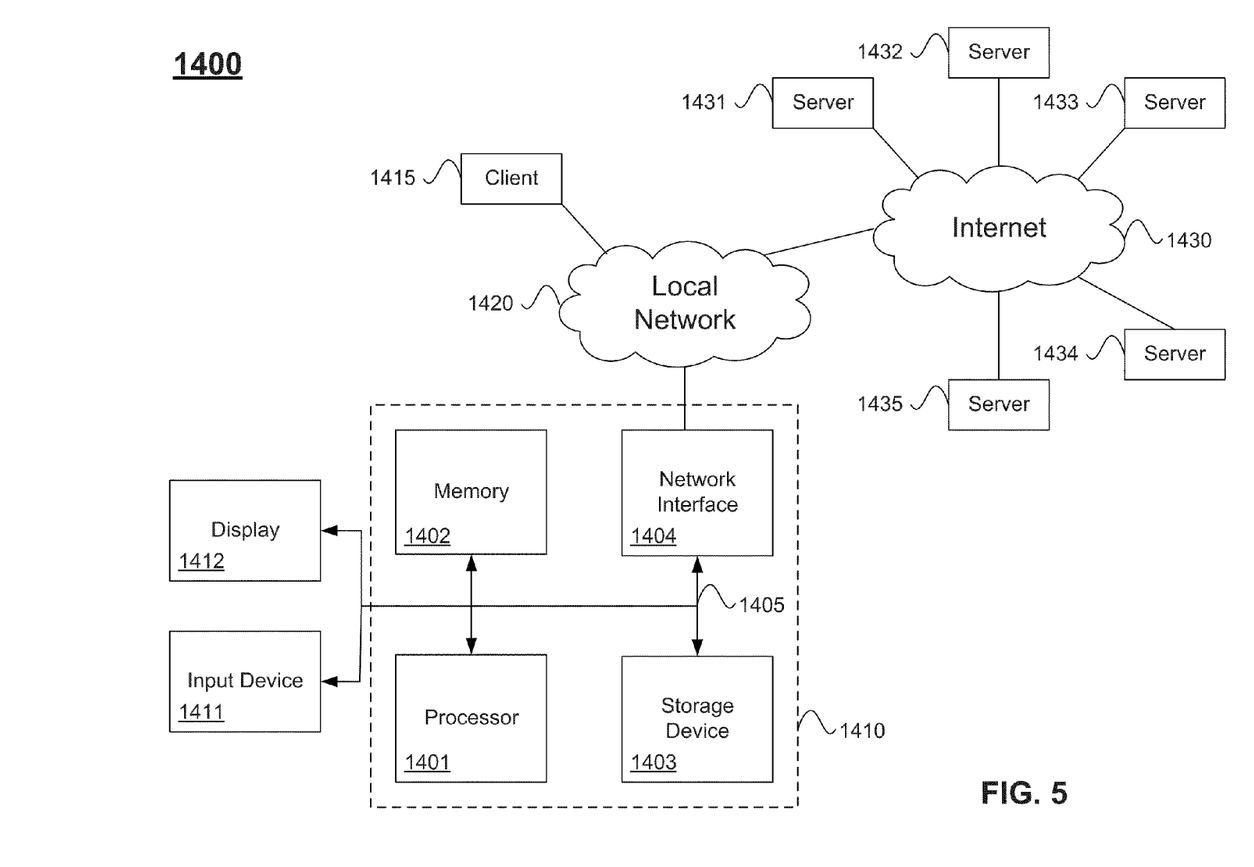
FIG. 5 is a block diagram of an example computer system and network 1400 for implementing embodiments of the present invention.

FIG. 5 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

The computer system and network 1400 may be configured in a client server manner. The client 1415 may include components similar to those of the computer system 1410.

More specifically, the client 1415 may implement one of the clients 102 (see FIG. 1). The computer system 1410 may implement one of the application servers 104 (see FIG. 1). The server 1431 may implement the database server 116 (see FIG. 1).

An embodiment of the present invention may have one or more features that distinguish it from other existing systems. One feature is that the measure can be transported from a development environment to a quality control environment or to a production environment. This allows a baseline type of measure to be developed that may then be rolled out to multiple production environments.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of analyzing data, comprising:
    storing, by a computer system, a column definition that includes metadata that defines a column;
    generating, by the computer system, a user interface that receives selection of a distance measure function for the column;
    storing, by the computer system, the distance measure function for the column as part of the metadata for the column in the column definition, wherein the distance measure function stored in the metadata for the column corresponds to rules for comparing a plurality of data values of the column, wherein the distance measure function stored in the metadata for the column corresponds to a function that compares the plurality of data values of the column;
    receiving, by the computer system, a request to compare the plurality of data values of the column;
    accessing, by the computer system after receiving the request, the distance measure function stored in the metadata for the column;
    generating, by the computer system after receiving the request, a plurality of distance measure results by applying the distance measure function stored in the metadata for the column to the plurality of data values; and
    displaying, by the computer system, a comparison between the plurality of distance measure results,
    wherein storing the distance measure function includes:
        receiving a first type for the distance measure function for the column,
        generating a first set of distance measure results that corresponds to the first type for the distance measure function,
        saving the distance measure function having the first type in the metadata for the column,
        receiving a second type for the distance measure function for the column, wherein the first type and the second type are two of a derived type, a distance along a hierarchy type, an axis distortion and automatic binning type, a categorical type, a routine type, and a measurement-specific adoption rule type,
        generating a second set of distance measure results that corresponds to the second type for the distance measure function, and
        saving the distance measure function having the second type in the metadata for the column.

2. The computer-implemented method of claim 1, wherein the distance measure function is a norm function stored in the metadata for the column, further comprising:
    calculating, by the computer system, a norm for the column according to the norm function.

3. The computer-implemented method of claim 1, wherein the distance measure function is a metric function stored in the metadata for the column, further comprising:
    calculating, by the computer system, a metric for the column according to the metric function.

4. The computer-implemented method of claim 1, wherein the column includes a plurality of component columns that include a plurality of distance measure functions, respectively, and wherein the distance measure function is derived from the plurality of distance measure functions of the plurality of component columns, respectively.

5. The computer-implemented method of claim 1, wherein the distance measure function stored in the metadata for the column is generated according to a distance along a hierarchy.

6. The computer-implemented method of claim 1, wherein the distance measure function stored in the metadata for the column is generated according to axis distortion and automatic binning.

7. The computer-implemented method of claim 1, wherein the distance measure function stored in the metadata for the column is generated according to a categorical metric.

8. The computer-implemented method of claim 1, further comprising:
    storing representations of the plurality of data values of the column, wherein the Representations are suited for comparison of the values.

9. The computer-implemented method of claim 1, further comprising:
    reading, by the computer system, all the plurality of data values from a Database prior to generating the plurality of distance measure results.

10. The computer-implemented method of claim 1, wherein the distance measure function stored in the metadata for the column includes external hierarchy information stored in the column definition.

11. The computer-implemented method of claim 1, wherein the distance measure function stored in the metadata for the column includes aggregated column information stored in the column definition.

12. A computer program, embodied on a tangible non-transitory recording medium, for controlling a computer system to analyze data, the computer program comprising:
    a database management program that is configured to control the computer system to store, in the computer system, a column definition that includes metadata that defines a column;
    a distance measurement generator program that is configured to control the computer system to generate a user interface that receives selection of a distance measure function for the column; and
    a comparison program,
    wherein the database management program is further configured to control the computer system to store the distance measure function for the column as part of the metadata for the column in the column definition, wherein the distance measure function stored in the metadata for the column corresponds to rules for comparing a plurality of data values of the column, and wherein the distance measure function stored in the metadata for the column corresponds to a function that compares the plurality of data values of the column, wherein the comparison program is configured to control the computer system to receive a request to compare the plurality of data values of the column, wherein the database management program is further configured to control the computer system to access, after receiving the request, the distance measure function stored in the metadata for the column, wherein the comparison program is further configured to control the computer system to generate, after receiving the request, a plurality of distance measure results by applying the distance measure function stored in the metadata for the column to the plurality of data values, and wherein the comparison program is further configured to control the computer system to display a comparison between the plurality of distance measure results, wherein storing the distance measure function includes:
- the database management program being further configured to control the computer system to receive a first type for the distance measure function for the column,
- the database management program being further configured to control the computer system to generate a first set of distance measure results that corresponds to the first type for the distance measure function,
- the database management program being further configured to control the computer system to save the distance measure function having the first type in the metadata for the column,
- the database management program being further configured to control the computer system to receive a second type for the distance measure function for the column, wherein the first type and the second type are two of a derived type, a distance along a hierarchy type, an axis distortion and automatic binning type, a categorical type, a routine type, and a measurement-specific adoption rule type,
- the database management program being further configured to control the computer system to generate a second set of distance measure results that corresponds to the second type for the distance measure function, and
- the database management program being further configured to control the computer system to save the distance measure function having the second type in the metadata for the column.

13. The computer program of claim 12, wherein:
the distance measure function is a norm function stored in the metadata for the column, and
the comparison program is further configured to control the computer system to calculate a norm for the column according to the norm function.

14. The computer program of claim 12, wherein the column includes a plurality of component columns that include a plurality of distance measure functions, respectively, and wherein the distance measure function is derived from the plurality of distance measure functions of the plurality of component columns, respectively.

15. The computer program of claim 12, wherein the distance measure function stored in the metadata for the column is generated according to a distance along a hierarchy.

16. The computer program of claim 12, wherein the distance measure function stored in the metadata for the column is generated according to axis distortion and automatic binning.

17. The computer program of claim 12, wherein the comparison program is further configured to control the computer system to store representations of the data values of the column, wherein the representations are suited for data value comparison.

18. The computer program of claim 12, wherein:
the distance measure function is a metric function stored in the metadata for the column, and
the comparison program is further configured to control the computer system to calculate a metric for the column according to the metric function.

19. A system for analyzing data, comprising:
a client computer that is configured to implement a presentation tier;
an application server that is configured to implement an application tier; and
a database server that is configured to implement a database tier, wherein the database server is configured to store a column definition that includes metadata that defines a column, wherein the application server is configured to control the client computer to generate a user interface that receives selection of a distance measure function for the column, wherein the database server is configured to store the distance measure function for the column as part of the metadata for the column in the column definition, wherein the distance measure function stored in the metadata for the column corresponds to rules for comparing a plurality of data values of the column, and wherein the distance measure function stored in the metadata for the column corresponds to a function that compares the plurality of data values of the column, wherein the application server is configured to receive a request to compare the plurality of data values of the column, wherein the database server is further configured to access, after receiving the request, the distance measure function stored in the metadata for the column, wherein the application server is further configured to generate, after receiving the request, a plurality of distance measure results by applying the distance measure function stored in the metadata for the column to the plurality of data values, and wherein the client computer is further configured to display a comparison between the plurality of distance measure results, wherein storing the distance measure function includes:
- the database server being further configured to receive a first type for the distance measure function for the column,
- the database server being further configured to generate a first set of distance measure results that corresponds to the first type for the distance measure function,
- the database server being further configured to save the distance measure function having the first type in the metadata for the column,
- the database server being further configured to receive a second type for the distance measure function for the column, wherein the first type and the second type are two of a derived type, a distance along a hierarchy type, an axis distortion and automatic binning type, a categorical type, a routine type, and a measurement-specific adoption rule type,
- the database server being further configured to generate a second set of distance measure results that corresponds to the second type for the distance measure function, and the database server being further configured to save the distance measure function having the second type in the metadata for the column.

20. The system of claim 19, wherein the distance measure function stored in the metadata for the column includes aggregated column information stored in the column definition.

* * * * *